(12) United States Patent
Huang

(10) Patent No.: US 9,191,640 B1
(45) Date of Patent: Nov. 17, 2015

(54) SYSTEMS AND METHODS FOR AUTOMATIC WHITE BALANCE OF IMAGES

(71) Applicant: Marvell International Ltd., Hamilton (BM)

(72) Inventor: Samson Huang, Saratoga, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 89 days.

(21) Appl. No.: 13/937,572

(22) Filed: Jul. 9, 2013

Related U.S. Application Data

(60) Provisional application No. 61/674,719, filed on Jul. 23, 2012, provisional application No. 61/714,566, filed on Oct. 16, 2012.

(51) Int. Cl.
*H04N 9/73* (2006.01)
*H04N 5/217* (2011.01)
*H04N 5/76* (2006.01)
*H04N 5/225* (2006.01)

(52) U.S. Cl.
CPC .......................................... *H04N 9/73* (2013.01)

(58) Field of Classification Search
None
See application file for complete search history.

(56) References Cited

U.S. PATENT DOCUMENTS

| 5,581,298 A * | 12/1996 | Sasaki et al. ................ 348/222.1 |
| 2002/0106206 A1 * | 8/2002 | Takeshita ...................... 396/429 |

* cited by examiner

*Primary Examiner* — Aung S Moe
*Assistant Examiner* — Euel Cowan

(57) ABSTRACT

System and methods are provided for performing white balancing of an image. An image including one or more pixels is received, wherein a pixel corresponds to an input color value. A light source of the image is determined based at least in part on the input color values of the pixels, wherein the light source is used for illumination when the image is captured. New color values of the pixels are generated to reduce color distortion caused by the light source of the image.

20 Claims, 4 Drawing Sheets

SYSTEMS AND METHODS FOR AUTOMATIC WHITE BALANCE OF IMAGES

CROSS-REFERENCE TO RELATED APPLICATIONS

This disclosure claims priority to and benefit from U.S. Provisional Patent Application No. 61/674,719, filed on Jul. 23, 2012, and U.S. Provisional Patent Application No. 61/714,566, filed on Oct. 16, 2012, the entirety of which are incorporated herein by reference.

FIELD

The technology described in this patent document relates generally to data processing and more particularly to digital image processing.

BACKGROUND

Human eyes typically have a "color constancy" ability to cope with different lighting conditions. For example, when a white object is illuminated under different light sources, a person can usually perceive the object as white despite the different light sources. However, digital cameras often do not have such a "color constancy" ability. When an image is captured by a digital camera, a light source used for illumination can often cause a white object in the captured image to appear "non-white." For example, a tungsten light bulb used for illumination can cause a white object to appear yellow or orange in the captured image. In another example, a white object may appear blue or even green in a captured image under a fluorescent bulb. In order to make a white object appear white in a digital image, pixel values of the image can be adjusted to reduce the color distortion caused by the light source of the image. This process of changing the pixel values of the captured image to compensate for the effects of the light source is often referred to as performing white balancing of the image.

SUMMARY

In accordance with the teachings described herein, systems and methods are provided for performing white balancing of an image. An image including one or more pixels is received, wherein a pixel corresponds to an input color value. A light source of the image is determined based at least in part on the input color values of the pixels, wherein the light source is used for illumination when the image is captured. New color values of the pixels are generated to reduce color distortion caused by the light source of the image.

In one embodiment, a processor-implemented system for performing white balancing of an image includes, one or more data processors, and a computer-readable storage medium encoded with instructions for commanding the data processors to execute operations. The operations include, (a) receiving an image including one or more pixels, wherein a pixel corresponds to an input color value, (b) determining a light source of the image based at least in part on the input color values of the pixels, wherein the light source is used for illumination when the image is captured, and (c) generating new color values of the pixels to reduce color distortion caused by the light source of the image.

In another embodiment, a digital image acquisition device includes a storage unit, a data processing system, and a white-balancing unit. The storage unit is configured to receive an image including one or more pixels, wherein a pixel corresponds to an input color value. The data processing system is configured to determine a light source of the image based at least in part on the input color values of the pixels, wherein the light source is used for illumination when the image is captured. The white-balancing unit is configured to generate new color values of the pixels to reduce color distortion caused by the light source of the image.

DETAILED DESCRIPTION

Figure 1:
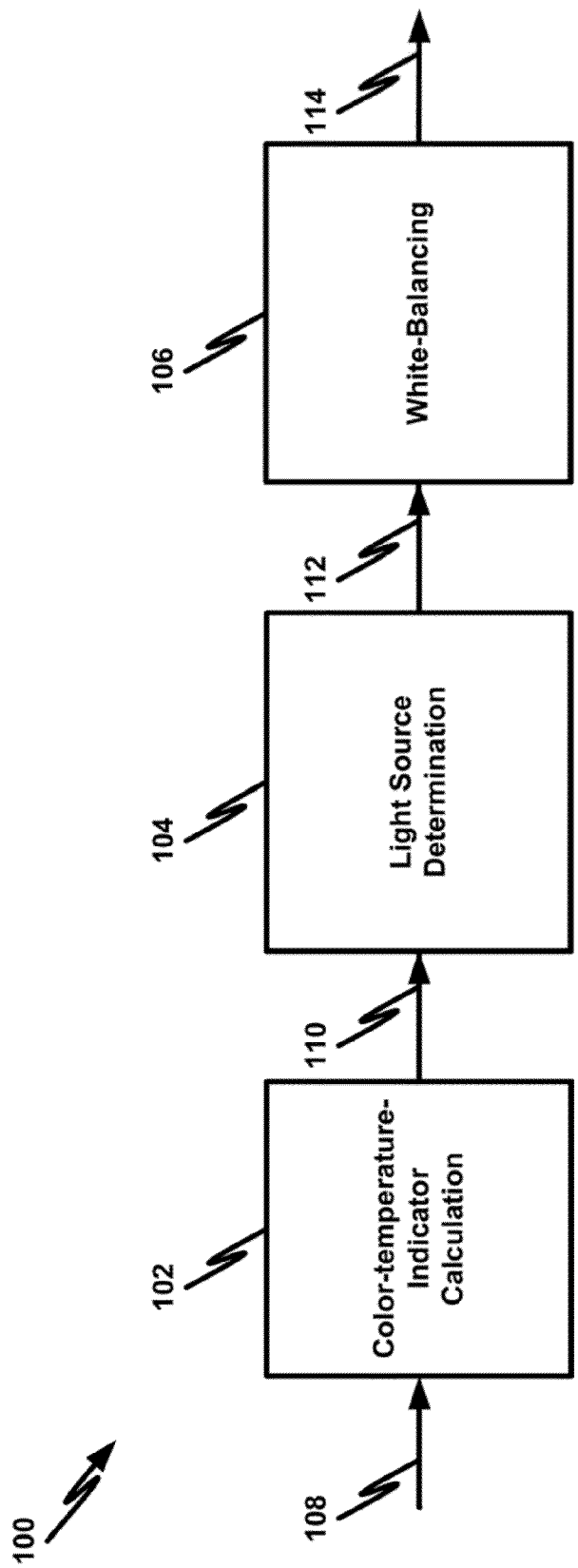
FIG. 1 depicts an example system for performing white balancing.

FIG. 1 depicts an example system 100 for performing white balancing. A color-temperature-indicator calculator 102 calculates a color-temperature indicator for an image 108, and a light-source component 104 determines a light source of the image 108 based on the calculated values of the color-temperature indicator. Then, a white-balancing component 106 performs white balancing of the image 108 in order to reduce the color distortion caused by the determined light source.

Specifically, the color-temperature-indicator calculator 102 receives the image 108 which includes a number of pixels, and calculates values of the color-temperature indicator 110 based on color values (e.g., R, G, B components) of the pixels in the image 108. The light-source component 104 determines the light source of the image, e.g., by mapping to known light sources using the calculated values of the color-temperature-indicator 110.

Figure 2:
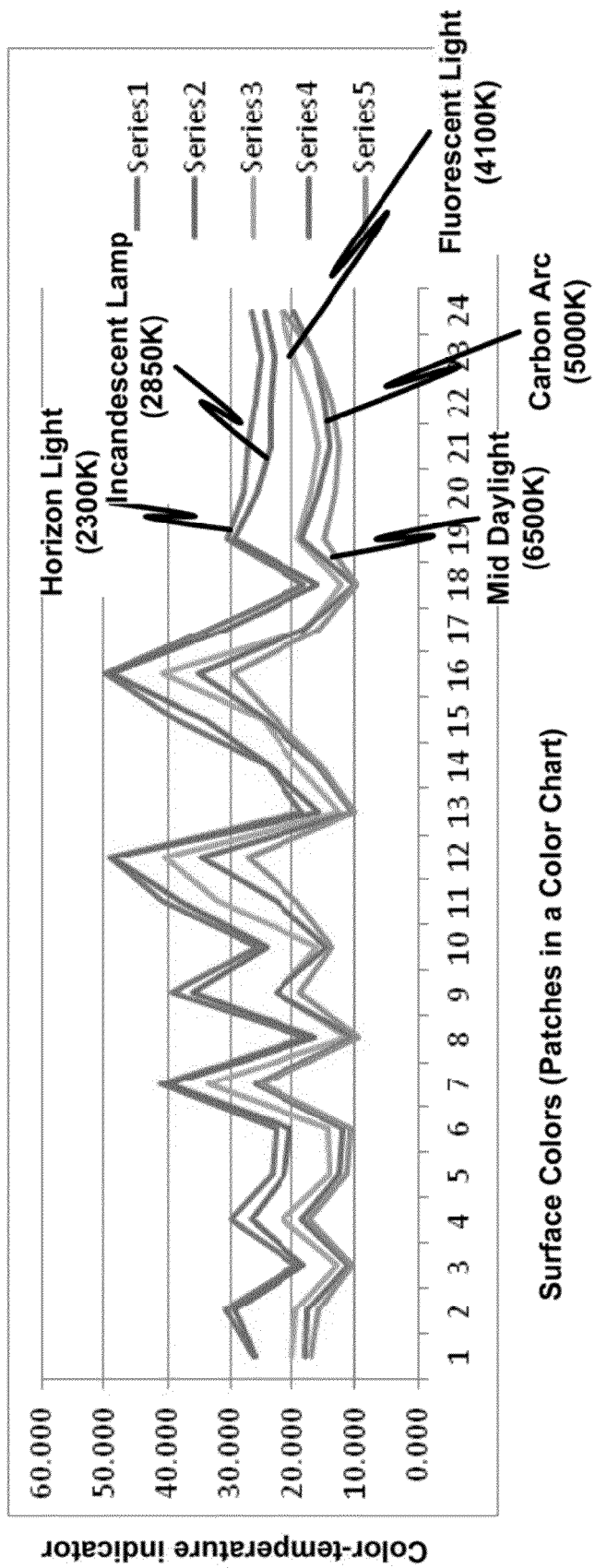
FIG. 2 depicts a diagram showing an example color-temperature indicator for a color chart under different light sources.

The color-temperature indicator used by the color-temperature-indicator calculator 102 may be pre-selected and can be used to detect different light sources. FIG. 2 depicts a diagram showing an example color-temperature indicator for a color chart (e.g., a Gretag Macbeth color chart) under different light sources. The example color-temperature indicator is $(R+a)/b+c/(B+d)$, where R represents a red component of a pixel in an image of the color chart, B represents a blue component of the pixel, and a, b, c and d represent four adjustable parameters. As shown in FIG. 2, the values of the color-temperature indicator are plotted against surface colors of twenty four patches m the color chart (e.g., from 1 to 24 on the horizontal axis) for five light sources with different color temperatures. For a particular patch in the color chart, the higher the color temperature, the smaller the value of the color-temperature indicator becomes.

For example, the first eighteen patches in the color chart (e.g., from 1 to 18) have different colors, and the last six patches (e.g., from 19 to 24) have various gray levels. The five light sources include the horizon light, the incandescent lamp, the fluorescent light, the carbon arc, and the mid daylight, of which the color temperature values are shown in Table 1.

TABLE 1

| Light Sources | Color Temperature (° K.) |
|---|---|
| Horizon light | 2300 |
| Incandescent lamp | 2850 |
| Studio lamp | 3200 |
| Shop light (TL84) | 4000 |
| Fluorescent light (Cool white) | 4100 |
| Carbon arc (D50) | 5000 |
| Mid daylight (D60) | 6500 |
| Overcast sky | 6500-8000 |
| Partly cloudy sky | 8000-10000 |

The variation of the color-temperature indicator with the color temperatures is clearly shown in FIG. 2, and thus the example color-temperature indicator, (R+a)/b+c/(B+d), is suitable for detecting light sources. For example, a light booth can be used to produce the light sources, and the color chart can be placed in the light booth to generate the image.

Figure 3:
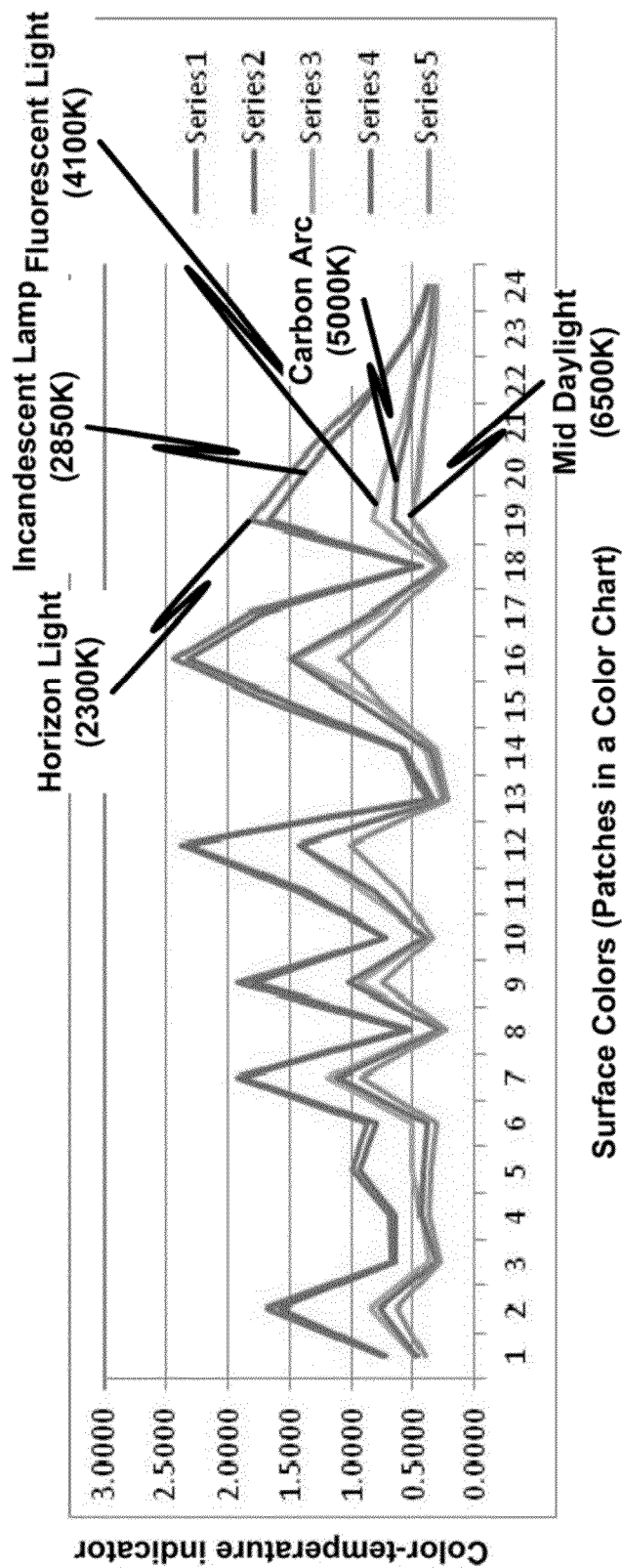
FIG. 3 depicts a diagram showing another example color-temperature indicator for the color chart under different light sources.

FIG. 3 depicts a diagram showing another example color-temperature indicator for the color chart (e.g., a Gretag Macbeth color chart) under different light sources. The example color-temperature indicator is (R+a)/(B+d), where R represents a red component of a pixel in an image of the color chart, B represents a blue component of the pixel, and a and d represent two adjustable parameters. As shown in FIG. 3, the higher the color temperature, the smaller the value of the color-temperature indicator becomes, for a particular patch in the color chart. The difference in the values of the color-temperature indicator for different color temperatures is clear, and thus, the example color-temperature indicator, (R+a)/(B+d), is also suitable for detecting light sources.

In addition, another color-temperature indicator R/(B+e) is suitable for detecting light sources, where e is an adjustable parameter. As an example, when e is set to be 12, a computer code for detecting a light source of an image using the color-temperature indicator R/(B+e) is shown below:

```
int main(int argc, char**argv) {
    IplImage* img=cvLoadImage(argv[1], 1);
    cvNamedWindow("Img",
        CV_13WINDOW_13AUTOSIZE);
    cvShowImage("Img", img);
    int H=img->height;
    int W=img->width;
    double R, G, B, Tmp;
    cout<<"Width=">>W;
    cout<<". Height=">>H>>endl>>endl;
    int i, j, k=0,
    double y[100];
    for(k=0; k<100; k++)
        y[k]=0.0;
    k=0;
    int step_x=W/200;
    int step_y=H/100;
    cout<<'step_x='<<step_x<<'; step _y ='<<step_y<<endl;
    for(j=5; j<H-5;j=j+step_y){
        for(i=5; i<W-5; i=i+step_x){
            CvPoint pt={i,j};
            R=((uchar*)(img->imageData+img->widthStep*pt.y))
                [pt.x*3+2];
            B=((uchar*)(img->imageData+img->widthStep*pt.y))
                [pt.x*3];
            y[k]=y[k]+R/(B+12);
        }
        y[k]=y[k]/200;
        cout<<". K="<<k<<", y="<<y[k];
        if(k%4==0)cout<<endl;
        if(k>=99)
            break;
        k++;
    }
    k=0;
    cout <<endl<<endl;
    for(k=0; k<100; k++) {
        Tmp=Tmp+y[k];
    }
    cout<<"Color Temp is"<<Tmp<<endl;
}
```

In some embodiments, other color-temperature indicators may be pre-selected for use in the example system 100 as shown in FIG. 1 to detect a light source of an image, such as R, G, B, R/G, and B/G.

With reference back to FIG. 1, after the color-temperature-indicator calculator 102 calculates values of a pre-selected color-temperature indicator for each pixel in the image 108, the light-source component 104 may map the calculated values to a predetermined look-up table or a predetermined diagram (e.g., FIG. 2, FIG. 3) to determine the light source of the image 108. Once the light source of the image 108 is determined, white balancing may be performed to compensate for the effects of the light source. For example, color values of a pixel may be multiplied by white-balancing factors to generate new color values of the pixel in order to reduce the color distortion caused by the light source of the image 108.

For example, a gray patch in the color chart (e.g., patch 19) has different color values under different light sources as shown in Table 2.

TABLE 2

| Light Sources | R | G | B |
|---|---|---|---|
| Horizontal light | 253 | 220 | 121 |
| Incandescent lamp | 252 | 234 | 147 |
| Shop light | 233 | 250 | 179 |
| Fluorescent light (cool white) | 226 | 254 | 188 |
| Mid daylight | 230 | 255 | 235 |

Ideally, the red component (R), the green component (G) and the blue component (B) of a gray pixel should be equal. However, under a particular light source, the red component, the green component and the blue component shown in Table 2 are not equal. White-balancing factors for the gray patch can be determined as follows:

$$K_r = \frac{(R+G+B)}{3R}$$

$$K_g = \frac{(R+G+B)}{3G}$$

$$K_b = \frac{(R+G+B)}{3B}$$

If the light source is determined to be the horizontal light, then the color values of the gray patch are R=253, G=220, B=121 as shown in Table 2. The white-balancing factors can be calculated: $K_r$=0.7826, $K_g$=0.9, $K_b$=1.6364. The new color values of the gray patch after white balancing can be determined as: $R'=K_r \times R=198$, $G'=K_g \times G=198$, $B'=K_b \times B=198$. Thus, the balanced color values indicate a gray pixel.

Table 3 below lists color values (R, G, B) of different gray patches in the color chart: under different color sources, as well as the corresponding gray levels (Y). For example. Y=0.299×R+0.587×G+0.114×B.

TABLE 3

| Light Sources | Patch # | R | G | B | Y |
|---|---|---|---|---|---|
| Horizontal light | 19 | 253 | 220 | 171 | 718.58 |
| | 20 | 228 | 194 | 102 | 193.68 |
| | 21 | 188 | 157 | 78 | 157.26 |
| | 22 | 136 | 110 | 52 | 111.16 |
| | 23 | 80 | 64 | 20 | 63.77 |
| | 24 | 40 | 26 | 6 | 27.91 |
| Incandescent lamp | 19 | 257 | 234 | 147 | 229.46 |
| | 20 | 221 | 204 | 122 | 199.74 |
| | 21 | 182 | 167 | 93 | 163.05 |
| | 22 | 131 | 117 | 62 | 114.92 |
| | 23 | 75 | 67 | 29 | 65.06 |
| | 24 | 33 | 25 | 7 | 25.34 |
| Shop light | 19 | 233 | 750 | 179 | 236.82 |
| | 20 | 206 | 224 | 156 | 210.87 |
| | 21 | 168 | 185 | 121 | 172.62 |
| | 22 | 117 | 133 | 81 | 122.29 |
| | 23 | 70 | 81 | 48 | 73.95 |
| | 24 | 32 | 39 | 16 | 34.29 |
| Fluorescent light (cool white) | 19 | 226 | 254 | 188 | 238.10 |
| | 20 | 200 | 233 | 166 | 215.50 |
| | 21 | 163 | 195 | 131 | 178.14 |
| | 22 | 115 | 143 | 89 | 128.47 |
| | 23 | 68 | 87 | 53 | 77.44 |
| | 24 | 31 | 44 | 19 | 37.26 |
| Mid daylight | 19 | 230 | 255 | 235 | 245.25 |
| | 20 | 198 | 227 | 206 | 215.94 |
| | 21 | 158 | 187 | 167 | 176.05 |
| | 22 | 110 | 135 | 116 | 125.36 |
| | 23 | 67 | 84 | 73 | 77.66 |
| | 24 | 33 | 44 | 37 | 39.91 |

Therefore, for pixels with different gray levels, different sets of white balance factors are used for white balancing. If a pixel has a gray level other than those listed in Table 3 or the light source of the image is different from those listed in Table 3, interpolation or extrapolation may be used to derive the corresponding color values and the corresponding white-balancing factors. Further, color correction may be performed on the image after the white-balancing.

Figure 4:
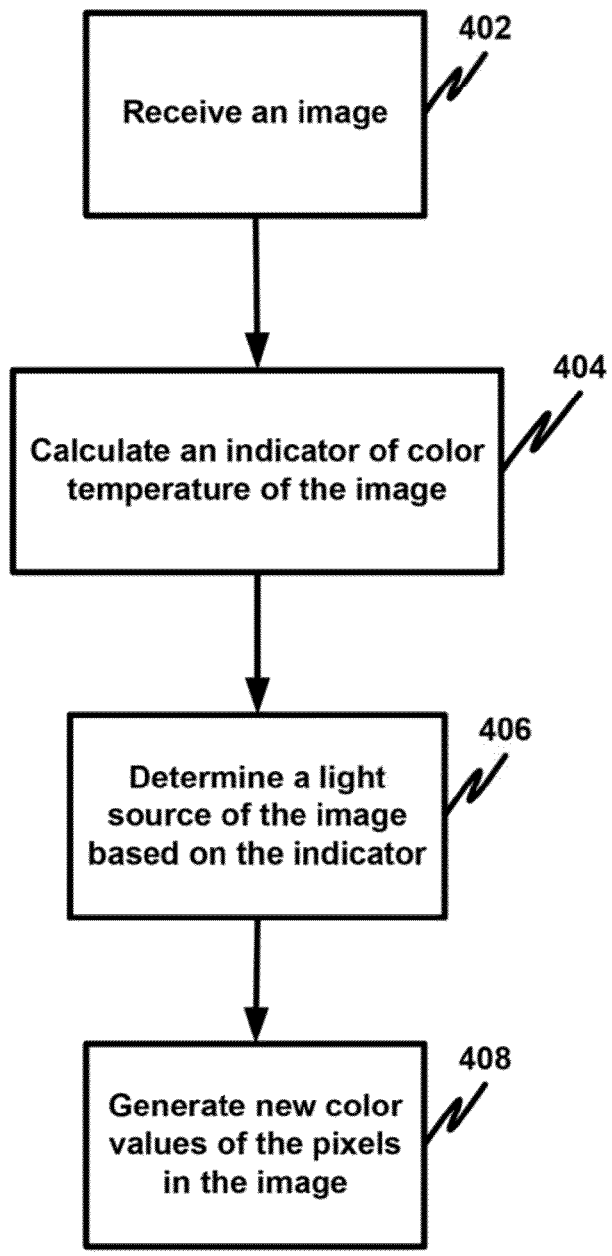
FIG. 4 depicts an example flow chart for performing white balancing of an image.

FIG. 4 depicts an example flow chart for performing white balancing of an image. At 402, a raw image including one or more pixels is received, where a pixel corresponds to an input color value. For example, the input color value includes a red component, a blue component and a green component. At 404, an indicator of color temperature of the image is calculated using the input color values of the pixels. At 406, a light source of the image is determined based at least in part on the indicator, where the light source is used for illumination when the image is captured. At 408, new color values of the pixels in the image are generated to reduce color distortion caused by the light source of the image.

This written description uses examples to disclose the invention, include the best mode, and also to enable a person skilled in the art to make and use the invention. The patentable scope of the invention may include other examples that occur to those skilled in the art.

For example, the systems and methods described herein may be implemented on many different types of processing systems by program code comprising program instructions that are executable by the system processing subsystem. Other implementations may also be used, however, such as firmware or appropriately designed hardware configured to carry out the methods and systems described herein. In another example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions e.g., software) for use in execution by a processor to perform the methods' operations and implement the systems described herein.

What is claimed is:

1. A method for performing white balancing of an image, the method comprising:
   receiving the image including one or more pixels, wherein a pixel corresponds to an input color value;
   calculating a color-temperature indicator of the image using the respective input color values of the one or more pixels and a set of adjustable parameters, a variation of the color-temperature indicator with color temperatures depending on the set of adjustable parameters;
   determining a color temperature of the image based at least in part on the calculated color-temperature indicator;
   determining a light source of the image based at least in part on the color temperature of the image, wherein the light source is used for illumination when the image is captured; and
   generating respective new color values of the one or more pixels to reduce color distortion caused by the light source of the image.

2. The method of claim 1, wherein the input color value includes a red component, a green component and a blue component.

3. The method of claim 2, wherein the color-temperature indicator of the image is determined as follows:

$(R+a)/b+c/(B+d)$ where R represents a red component of a pixel, B represents a blue component of the pixel, and a, b, c and d represent the set of adjustable parameters.

4. The method of claim 2, wherein the color-temperature indicator of the image is determined as follows:

$(R+a)/(B+d)$ were R represents a red component of a pixel, B represents a blue component of the pixel, and a and d represent the set of adjustable parameters.

5. The method of claim 2, wherein the color temperature indicator of the image is determined as follows:

$R/(B+e)$ where R represents a red component of a pixel, B represents a blue component of the pixel, and e represents one or more adjustable parameters.

6. The method of claim 1, wherein determining the color temperature of the image based at least in part on the calculated color-temperature indicator includes:
   mapping color-temperature indicator values for the pixels to predetermined color-temperature indicator values of an of the image under known light sources.

7. The method of claim 1, wherein generating the new color values of the pixels includes:
   receiving a first pixel corresponding t a first input color value;
   determining a set of white balancing factors for the first pixel; and
   generating a second color value of the first pixel based at least in part on the set of white balancing factors.

8. A processor-implemented system for performing white balancing of an image, the system comprising:
   one or more data processors;

a computer-readable storage medium encoded with instructions for commanding the data processors to execute operations including:
  receiving the image including one or more pixels, wherein a pixel corresponds to an input color value;
  calculating a color-temperature indicator of the image using the respective input color values of the one or more pixels and a set of adjustable parameters, a variation of the color-temperature indicator with color temperatures depending on the set of adjustable parameters;
  determining a color temperature of the image based at least in part on the calculated color-temperature indicator;
  determining a light source of the image based at least in part on the color temperature of the image, wherein the light source is used for illumination when the image is captured; and
  generating respective new color values of the one or more pixels to reduce color distortion caused by the light source of the image.

9. The system of claim 8, wherein the input color value includes a red component, a green component and a blue component.

10. The system of claim 9, wherein the color-temperature indicator of the image is determined as follows:

(R+a)/b+c/(B+d)

where R represents a red component of a pixel, B represents a blue component of the pixel, a, b, c and d represent the set of adjustable parameters.

11. The system of claim 9, wherein the color-temperature indicator of the image is determined as follows:

(R+a)/(B+d)

where R represents a red component of a pixel, B represents a blue component of the pixel, and a and d represent the set of adjustable parameters.

12. The method of claim 9, wherein the color temperature indicator of the image is determined as follows:

R/(B+e)

where R represents a red component of a pixel, B represents a blue component of the pixel, and e represents one or more adjustable parameters.

13. A digital image acquisition device comprising:
  a storage unit configured to receive an image including one or more pixels, wherein a pixel corresponds to an input color value;
  a data processing system configured to;
    calculate a color-temperature indicator of the image using the respective input color values of the one or more pixels and a set of adjustable parameters, a variation of the color-temperature indicator with color temperatures depending on the set of adjustable parameters;
    determine a color temperature of the image based at least in part on the calculated color-temperature indicator;
    determine a light source of the image based at least in part on the color temperature of the image, wherein the light source is used for illumination when the image is captured; and
  a white-balancing unit configured to generate respective new color values of the one or more pixels to reduce color distortion caused by the light source of the image.

14. The device of claim 13, wherein the input color value includes a red component, a green component and a blue component.

15. The device of claim 14, wherein the color-temperature indicator of the image is determined as follows:

(R+a)/b+c/(B+d)

where R represents a red component of a pixel, B represents a blue component of the pixel, and a, b, c and d represent the set of adjustable parameters.

16. The device of claim 14, wherein the color-temperature indicator of the image is determined as follows:

(R+a)/(B+d)

where R represents a red component of a pixel, B represents a blue component of the pixel, and a and d represent the set of adjustable parameters.

17. The method of claim 14, wherein the color temperature indicator of the image is determined as follows:

R/(B+e)

where R represents a red component of a pixel, B represents a blue component of the pixel, and e represents one or more adjustable parameters.

18. The method of claim 7, wherein the set of white balancing factors are determined as follows:

$$K_r = \frac{(R+G+B)}{3R}$$
$$K_g = \frac{(R+G+B)}{3G},$$
$$K_b = \frac{(R+G+B)}{3B}$$

where R represents a red component of the first input color value, B represents a blue component of the input color value, G represents a green component of the input color value, and $K_r$, $K_g$ and $K_b$ represent the set of white balancing factors corresponding to the R, G, B components respectively.

19. The method of claim 1, wherein one or more of the set of adjustable parameters are adjusted to generate a particular variation of the color-temperature indicator with color temperatures for determining the light source.

20. The method of claim 6, wherein the predetermined color-temperature indicator values of the image under the known light sources are generated using the set of adjustable parameters.

* * * * *